(12) United States Patent
Fuller

(10) Patent No.: US 7,668,609 B2
(45) Date of Patent: Feb. 23, 2010

(54) DIGITAL AUDIO DATA RECEIVER WITHOUT SYNCHRONIZED CLOCK GENERATOR

(75) Inventor: J. Scott Fuller, Scotts Valley, CA (US)

(73) Assignee: Creative Technology Ltd, Singapore (SG)

(*) Notice: Subject to any disclaimer, the term of this patent is extended or adjusted under 35 U.S.C. 154(b) by 0 days.

(21) Appl. No.: 10/911,385

(22) Filed: Aug. 3, 2004

(65) Prior Publication Data
US 2005/0060052 A1    Mar. 17, 2005

(51) Int. Cl.
G06F 17/00 (2006.01)
H04L 7/02 (2006.01)

(52) U.S. Cl. .................... 700/94; 375/361
(58) Field of Classification Search ............. 700/94; 375/316, 327–378; 331/10–11, 25; 713/400
See application file for complete search history.

(56) References Cited

U.S. PATENT DOCUMENTS

| | | | | |
|---|---|---|---|---|
| 5,134,632 A * | 7/1992 | Fletcher et al. | ............. | 375/238 |
| 5,258,999 A * | 11/1993 | Wernimont et al. | ............ | 375/7 |
| 5,365,468 A * | 11/1994 | Kakubo et al. | .............. | 708/313 |
| 5,491,713 A * | 2/1996 | Kwok et al. | ................. | 375/333 |
| 5,617,058 A * | 4/1997 | Adrian et al. | ................. | 330/10 |
| 6,081,561 A * | 6/2000 | Julyan et al. | ................ | 375/340 |
| 6,097,322 A * | 8/2000 | Tournier | ...................... | 341/70 |
| 6,449,519 B1 * | 9/2002 | Kuwaoka | ..................... | 700/94 |
| 6,772,021 B1 * | 8/2004 | Fuller | ......................... | 700/94 |

* cited by examiner

Primary Examiner—Curtis Kuntz
Assistant Examiner—Daniel R Sellers

(57) ABSTRACT

A method and apparatus for receiving digital audio data which does not require the recovery of a clock from the data. Instead, the digital audio data is sampled at a rate greater than a clock rate of the digital audio data. Appropriate transitions in the digital audio data are detected to allow reconstruction of digital values represented by the digital audio data.

14 Claims, 2 Drawing Sheets

DIGITAL AUDIO DATA RECEIVER WITHOUT SYNCHRONIZED CLOCK GENERATOR

CROSS-REFERENCES TO RELATED APPLICATIONS

Application claims priority of U.S. patent application Ser. No. 09/193,218, filed Nov. 16, 1998, titled "Digital Audio Data Receiver Without Synchronized Clock Generator", now U.S. Pat. No. 6,772,021, the disclosure of which is incorporated by reference in its entirety.

BACKGROUND OF THE INVENTION

The present invention relates to digital audio interfaces, and in particular to receivers which can receiver S/PDIF and AES digital audio signals.

S/PDIF is a digital audio interface standard commonly used in consumer digital audio equipment, including personal computers. AES is a digital audio interface which is prevalent in professional equipment. Both of these formats are a one direction serial interface which is Manchester encoded in order to provide an embedded clock so that a single data wire is sufficient for the interface.

Manchester encoding encodes digital bits serially in the following manner. The data is sent in a number of bit cells, with each cell having either a one or a zero. It is mandatory that there be a signal transition from low to high or high to low at the boundary of each cell. A one is encoded by having a transition in the middle of the cell, while a zero is encoded by having no transition in the middle of the cell. This is illustrated in FIG. 1, which shows a number of cell boundaries 10. As can be seen, the zeros have no transitions in the middle of the cell, while the ones do. Note that the zero can be either be a high or low value within a cell, and that the one can either start out low or start out high, ending the opposite. A preamble is indicated by violating the Manchester rule of having a transition at the cell boundary. Thus, a preamble is typically one and one-half bit cells long, and can be detected since there is no transition at the bit cell boundary.

In audio equipment, the original audio data from a human voice, musical instrument, etc., is in analog form. This is sampled at a high data rate, with each sample being then converted into a multi-bit digital value. These digital values can then be sent serially from one place to another in the digital circuit or to other digital equipment using Manchester coding.

To receive a Manchester coded signal, a receiver will typically extract the embedded clock using a phased locked loop (PLL). A phased locked loop is a combination of digital and analog circuitry which allows the generation of a clock corresponding to the bit cell transitions of the Manchester encoded data. Using the recovered clock, the data can then be covered. As can be seen, once the clock is obtained and the transition boundaries are then known, the recovering circuit can simply look to see whether or not there is a transition near the middle of the clock.

Where a particular piece of audio equipment receives multiple digital audio streams, one method is to transmit a "house sync" and require all devices sending data to become phase locked to the house sync. In this manner, the receiver would not require a PLL. A disadvantage to this approach is that the house sync needs to be communicated to all transmitting devices, and most consumer equipment such as CD-players, CD-ROMs, DAT players and Mini-disks do not provide the sync-lock feature this would require.

SUMMARY OF THE INVENTION

The present invention provides a method and apparatus for receiving digital audio data which does not require the recovery of a clock from the data. Instead, the digital audio data is sampled at a rate greater than a clock rate of the digital audio data. Appropriate transitions in the digital audio data are detected to allow reconstruction of digital values represented by the digital audio data.

The unique application of a type of sampling technique to digital audio data eliminates the need for a PLL, and allows recovery of the audio data with simple circuitry. No analog circuitry is required, and the device can be constructed purely digital (CMOS) circuits. The invention allows the system clock for the circuit to be generated by a typical crystal oscillator. This makes it easy to have a high quality (low phase noise) system clock. Another advantage is that multiple, independent data input streams can be received using a single system clock. There is no need for a "house sync", since the circuit easily recovers the data using the system clock, without recovering the digital audio clock. This enables multiple independent data streams at widely-different clock rates to be received.

In a preferred embodiment, the invention doesn't even use the transition in the middle of the bit cell to detect the data. Rather, this mid-cell transition for an encoded one is ignored. Instead, the invention relies on the recognition that the bit-cell boundary transitions will always be in the same direction for a digital one and in opposite directions for digital zero. Thus, by comparing a bit cell boundary transition to the last bit cell boundary transition (which has been saved), the value of the digital bit can be determined.

Preferably, the bit stream is decoded using a state machine. Digital counters are used to determine the pulse width between transitions. By detecting a preamble, and setting a "sync size" value in a register, a stored reference which is 1.5 times that of a zero is provided. By ignoring transitions which are less than two-thirds of the sync size, the bit cell transitions can be enabled for detection and used to decode the data.

For a further understanding of the nature and advantages, of the invention, reference should be made to the following description taken in conjunction with the accompanying drawings.

DESCRIPTION OF THE SPECIFIC EMBODIMENTS

Figure 2:
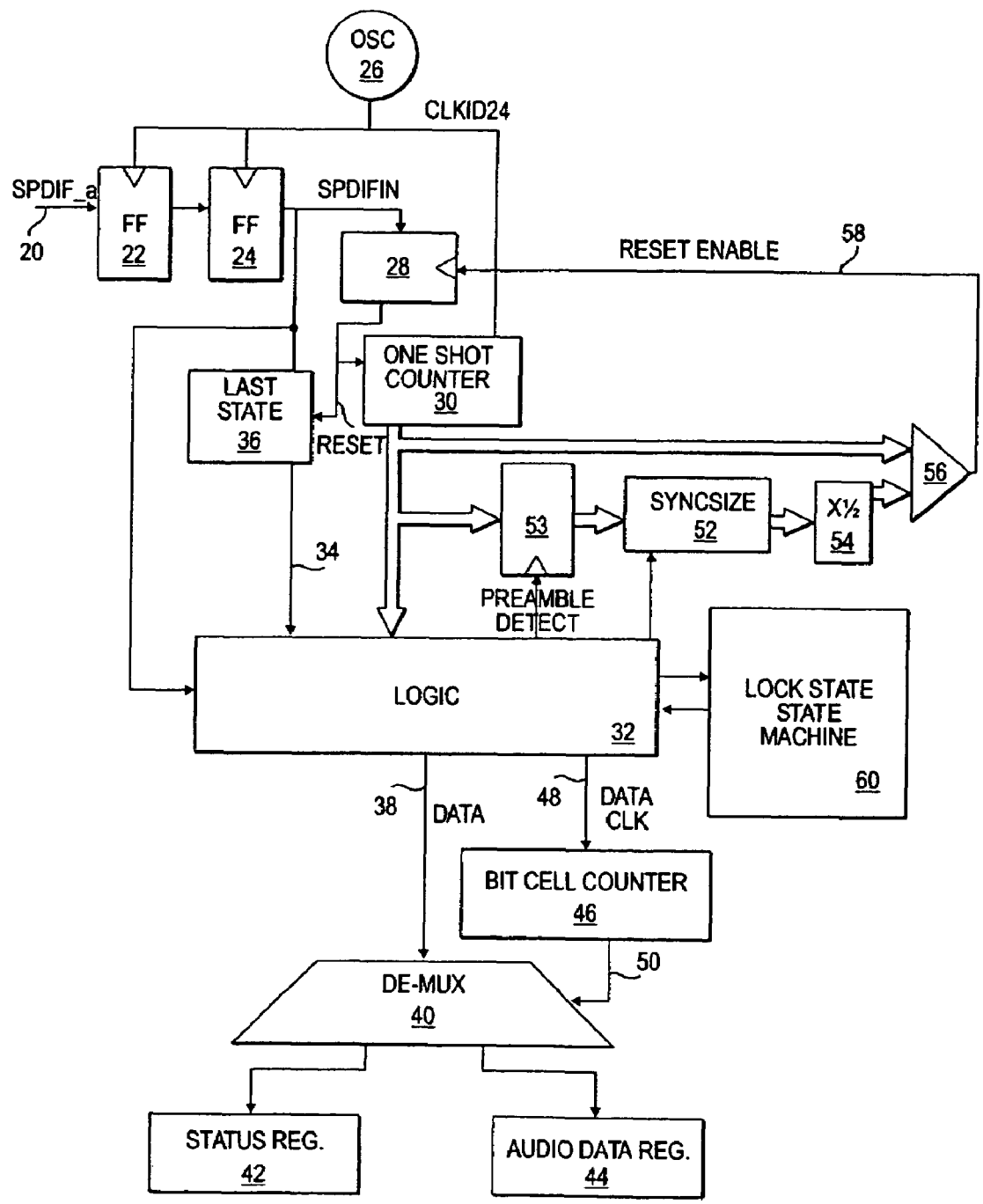
FIG. 2 is a block diagram of one embodiment of the invention.

FIG. 2 is a block diagram illustrating the functions of the logic in one embodiment of the invention. The figure is designed for conceptual understanding, and is not an exact implementation of a preferred embodiment set forth in the VHDL code in the Appendix. FIG. 2 shows the SPDIF_a input signal on an input line 20. The signal passes through two flip flops 22 and 24 to produce an output signal SPDIFIN. The flip flops are clocked by an oscillator 26, referred to as clk1024. Oscillator 26 provides a clock which is preferably at least 4, and more preferably at least 8 or 16, times the rate of the audio data. In one embodiment, SPDIF data has an audio sampling rate between 11 kHz and 97 kHz, resulting in a bit cell rate of up to 3 mHz, giving transition rates of up to 6 mHz.

Thus, a desirable minimum clock of 4 times the transition rate would be about 25 mHz. More preferably, a 50 or 100 mHz clock would be used.

The two flip flops 22 and 24 condition the input signal to produce SPDIFIN, which is then provided through a gate 28 to a counter 30. Counter 30 counts the number of clock pulses between transitions, while gate 28 allows only bit cell end transitions to reset the counter. The resetting of the counter is noted by logic block 32, which determines whether the data is a one or a zero by comparing the transition of SPDIFIN to a last state on a line 34 as saved in a flip flop or other circuit 36. The decoded data is then sent on data lines 38 to a demultiplexer 40, where it either is provided to a status register 42 or an audio data register 44. A bit cell counter 46 counts the number of bit cells from a data clock 48 which is incremented for each bit transmitted to multiplexer 40. Bit cell counter 46 determines when the status data has ended and audio data is being sent, and selects demultiplexer 40 appropriately on line 50.

The detection of data is accomplished using a SyncSize register 52. This is initially filled with a minimum value, labeled MINSYNCSIZE. Each time a count between transitions exceeds this value, it is updated until it reaches the count corresponding to a detected preamble. Each signal exceeding its count is assumed to be a preamble, until shown by subsequent, larger signal that it was not. The detection of a preamble by logic 32 allows the counter to be loaded into SyncSize register 52 through a gate 53. Once the preamble is detected, its value in the SyncSize register allows the detection of ones and zeros. Since the preamble is 1.5 times the pulse length of a zero, multiplying this by a value of one-half in logic 54, provides a value to comparator 56 which is larger than the half pulse of a one, but smaller than the full pulse length of a zero. Thus, a reset enable signal on line 58 is activated whenever the count exceeds this value, which means that the point of any intermediate transition for a digital one has passed. This enables block 28, which allows the next transition to pass through and reset counter 30.

Figure 1:
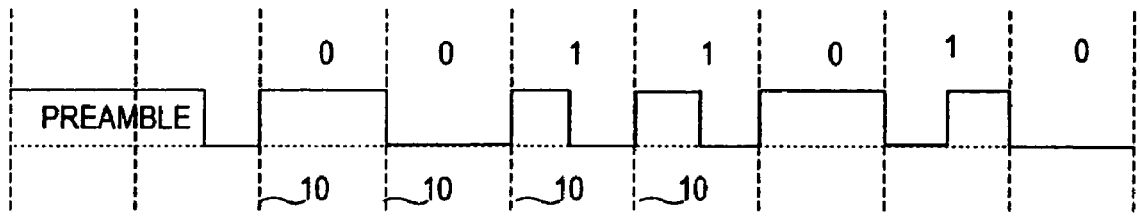
FIG. 1 is a diagram of the prior art Manchester-coding scheme.
Figure 3:
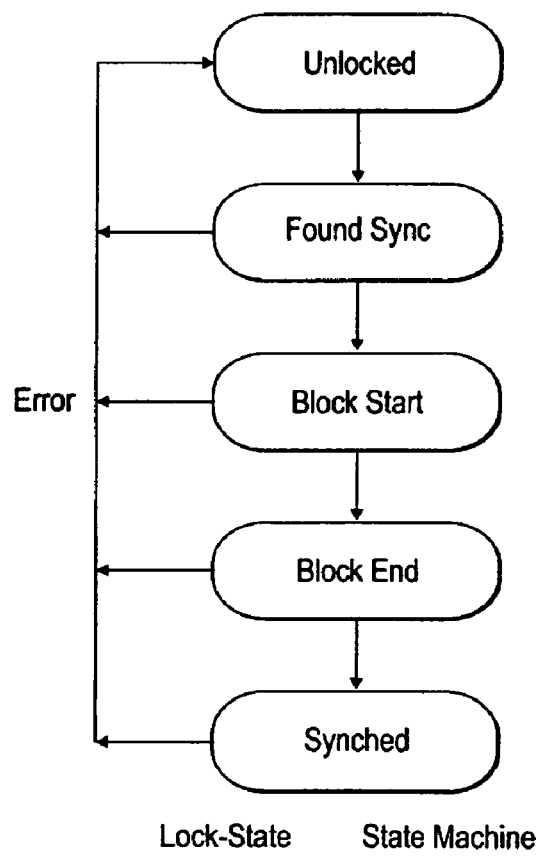
FIG. 3 is a state diagram of a lock-state state machine according to one embodiment of the invention.

A lock-state state machine 60 is used to keep track of the level of validation of the incoming signal. FIG. 3 is a state diagram of the state machine 60. It is initially reset to a state called UNLOCKED. The state machine moves to the FoundSync state when ONESHOT counter 30 provides a count greater than 13/16 of the SyncSize, and the count is less than an arbitrarily large maximum number MAXSYNCSIZE.

Logic block 32 actually filters and averages the SyncSize in register 52 when the preamble has been detected. This is done because the rise and fall times can be different, and thus a more accurate value is obtained.

If the receiver is UNLOCKED the SyncSize is decremented once a sample period until it reaches MINSYNCSIZE.

The BitCellCounter 46 counts how many bits cells are found between preambles including 20 bits of audio, 4 bits of AUX data, 4 bits for PCUV, and three bits of preamble code for a total of 31 bits in a properly formed word. The BitCellCounter saturates to "11111" which is an error condition.

The LastState signal 34 is used to determine if a transition occurred during the bit cell in order to decode the Manchester data.

The FrameCount is how many bits of left channel status have been counted. It is incremented by the Y-preamble (right) but reset by the Z-preamble (first left). FrameCount is decoded so that only the first 32 bits of channel status are recorded in the RunningStatus shift register. The RightEnd and LeftEnd enable output registers are based on the preamble data which is found in the data ShiftRegister (2:0).

When ResetBitCellCount='1' the ShiftRegister data has the meaning: 30 29 28 27 26 25 24 23 22 21 20 19 18 17 16 15 14 13 12 11 10 9 8 7 6 5 4 3 2 1 0 P C U V MS - - - AUDIO - - - Ls AAAA P R E Bits 2:0 are a preamble code data.

Bits 6:0 are the AUX bits (unused).

Bits 26:7 contain the 20 bit audio data.

Bits 28:27 (U and V) are ignored.

Bit 29 Channel status (captured for the first 32 bits of left status)

Bit 30 "parity" (not used)

Lock State Machine:

The lock detect state machine has 5 possible states ranging from UNLOCKED to SYNCHED. The five stages are:

UNLOCKED: Startup State

FOUNDSYNC: A preamble manchester violation has been found

BLOCKSTART: A Left Start "Z-Preamble" has been detected

BLOCKEND: A Second Z-Preamble has been detected

SYNCHED: All outputs are valid

The output LOCKED_o indicates the state machine is in the SYNCHED state. Reset puts LockState in the UNLOCKED state, and also sets SyncSize to MINSYNCSIZE:="010100". The state machine ideally proceeds from UNLOCKED through all the states and resides in the SYNCHED state. Several error conditions are detected which put the state machine in the UNLOCKED state from any state.

Error Conditions:

SyncSize=MINSYNCSIZE

SyncSize=MAXSYNCSIZE

BitCells>30

The number of cells between preamble detections was not 30.

The parity was incorrect.

The three bit preamble code did not match one of the three expected preambles.

The Z-Preamble was detected but was not 192 samples from the last Z-Preamble.

The LockState state variable does not match one of the five valid state encodings.

Synchronization:

The LockState is assumed to be UNLOCKED due to reset or an error condition. When an apparent preamble is detected (SyncFound='1') the OneShot count from counter 30 is saved in SyncSize register 52 and the LockState is advanced to FOUNDSYNC. If the incoming sample rate is low a zero can be misinterpreted as a preamble. If this happens a second zero will cause error condition 4 and reset the LockState to UNLOCKED. If no zero is present or a valid preamble is next detected it will also cause error condition 4, and the SyncSize will be loaded with a correct value. Once SyncSize is correctly set, preambles will be correctly identified, and ones and zeros will be correctly distinguished. If the SyncSize is larger and the incoming sample rate is high, SyncFound will remain false. This will cause the BitCells count to saturate at 31, and cause error condition 3. This condition will persist because SyncSize would remain large enough to prevent SyncFound from becoming true. When LockState is UNLOCKED, SyncSize is decremented once a sample period until either LockState changes (due to FoundSync) or SyncSize has reached MINSYNCSIZE. Again the first valid preamble will cause SyncSize to be updated.

Once SyncSize is appropriately set the receiver will correctly decode preambles and data, and proceed with the LockState state sequence.

Channel Status Interrupt:

When the Lock State is not LOCKED the CHANSTATUS_o in status register 42 is set to all one's. When the CHANSTATUS_o changes, a one clock wide positive pulse is generated on the INT_o signal. This will alert the host that either the channel status has changed or the LOCK_o has changed (or both). The CHANSTATUS_o is initialized to all ones by RESETN_nia. A Channel status of all ones includes many reserved bits (see EIC958) which are expected to be zero, which makes it a suitable status for the UNLOCKED condition.

Exhibit 1 attached hereto is a VHDL source code which can be synthesized into logic gates implementing an embodiment of the invention corresponding to the block diagram of FIG. 2.

As will be understood by those skilled in the art, the present invention may be embodied in other specified forms without departing from the essential characteristics thereof. Accordingly, the foregoing description is intended to illustrative, but not limiting, of the scope of the invention which is set forth in the following claims.

What is claimed is:

1. A method for decoding digital audio data, comprising:
    over-sampling said digital audio data at a sampling rate greater than a clock rate of said digital audio data;
    detecting transitions in said digital audio data that allow decoding of digital values represented by said digital audio data; and
    decoding said digital values represented by said digital audio data from said transitions by comparing states of transitions and without recovering a digital audio clock corresponding to said clock rate.

2. The method of claim 1 wherein said digital audio data comprises Manchester encoded data, said sampling rate is at least four times said clock rate of said digital audio data, and said transitions are detected without relying on recovery of said digital audio clock.

3. The method of claim 1 wherein said digital audio data comprises Manchester encoded digital data.

4. The method of claim 1, wherein the transitions correspond to cell boundaries of said digital audio data.

5. A method for receiving digital audio data, comprising:
    over-sampling said digital audio data at a sampling rate greater than a clock rate of said digital audio data, wherein said digital audio data comprises Manchester encoded digital data;
    detecting transitions in said digital audio data that allow a reconstruction of digital values represented by said digital audio data;
    ignoring mid-pulse transitions of said Manchester encoded digital data;
    determining a data value from a comparison to a last transition; and
    reconstructing said digital values from said transitions without recovering a digital audio clock corresponding to said clock rate.

6. The method of claim 5 further comprising:
    storing a SyncSize corresponding to a size of a preamble of said Manchester encoded data; and
    recognizing as a new bit cell boundary a next transition of said digital audio data at least ⅔ of said size of said preamble after a previous transition corresponding to a bit cell boundary.

7. An apparatus for decoding digital audio data, comprising:
    a clock circuit providing a clock signal having a rate greater than a clock rate of said digital audio data;
    a sampling circuit, having a clock input coupled to said clock circuit, configured to sample said digital audio data at a sampling rate corresponding to said clock signal;
    a transition detection circuit configured to detect transitions in said digital audio data that allow decoding of digital values represented by said digital audio data; and
    a data generation circuit configured to decode said digital values represented by said digital audio data from transitions by comparing states of transitions and without recovering a digital audio clock corresponding to said clock rate of said digital audio data.

8. The apparatus of claim 7 wherein said sampling rate is at least four times said clock rate of said digital audio data.

9. The apparatus of claim 7 wherein said digital audio data comprises Manchester encoded digital data.

10. The apparatus of claim 7, wherein the transitions correspond to cell boundaries of said digital audio data.

11. An apparatus for receiving digital audio data, comprising:
    a clock circuit providing a clock signal having a rate greater than a clock rate of said digital audio data, wherein said digital audio data comprises Manchester encoded digital data;
    a sampling circuit, having a clock input coupled to said clock circuit, configured to sample said digital audio data at a sampling rate corresponding to said clock signal;
    a transition detection circuit configured to detect transitions in said digital audio data that allow a reconstruction of digital values represented by said digital audio data, wherein said transition detection circuit is configured to ignore mid-pulse transitions of said Manchester encoded digital data; and
    a data generation circuit configured to reconstruct said digital values from said transitions without recovering a digital audio clock corresponding to said clock rate of said digital audio data, wherein said data generation circuit is configured to determine a data value from a comparison to a last transition.

12. A method of decoding an audio input signal having Manchester encoded data clocked at an input data clock rate, the method comprising:
    oversampling the audio input signal at a system clock rate greater than the input data clock rate;
    determining the bit cell boundary transitions for the encoded data by counting the pulses between transitions according to the system clock, and without relying on recovery of the input data clock rate; and
    decoding the data embedded in the audio input signal from states of the determined successive bit cell boundary transitions.

13. A method for recovering data embedded in a digital signal, comprising:
    over-sampling the digital signal;
    determining bit cell boundary transitions from the over-sampled digital signal; and
    using the determined bit cell boundary transitions in recovering the embedded data;
    wherein using the determined bit cell boundary transitions comprises recognizing that the determined bit cell boundary transitions are in a same direction for a digital one and in an opposite direction for a digital zero in comparing successively determined bit cell boundary transitions to recover the embedded data.

14. The method of claim 13, wherein determining the bit cell boundary transitions comprises:
    ignoring mid-cell transitions.

* * * * *